United States Patent
Lyall

(10) Patent No.: US 9,361,475 B2
(45) Date of Patent: Jun. 7, 2016

(54) AUTOMATED ATTENDED SELF-SERVICE TERMINAL (SST) OPERATIONS

(71) Applicant: NCR Corporation, Duluth, GA (US)

(72) Inventor: John Lyall, Dundee (GB)

(73) Assignee: NCR Corporation, Duluth, GA (US)

(*) Notice: Subject to any disclaimer, the term of this patent is extended or adjusted under 35 U.S.C. 154(b) by 0 days.

(21) Appl. No.: 14/231,055

(22) Filed: Mar. 31, 2014

(65) Prior Publication Data

US 2015/0278537 A1    Oct. 1, 2015

(51) Int. Cl.
*G06F 21/00* (2013.01)
*G06F 21/62* (2013.01)
*G07F 19/00* (2006.01)

(52) U.S. Cl.
CPC .......... *G06F 21/6218* (2013.01); *G07F 19/206* (2013.01); *G07F 19/211* (2013.01)

(58) Field of Classification Search
USPC ..................................... 726/17–20
See application file for complete search history.

(56) References Cited

U.S. PATENT DOCUMENTS

| | | | |
|---|---|---|---|
| 2006/0010131 A1* | 1/2006 | Chisholm | G06F 21/6218 |
| 2011/0296194 A1* | 12/2011 | Herkes et al. | 713/185 |
| 2012/0124365 A1* | 5/2012 | Black et al. | 713/150 |

* cited by examiner

*Primary Examiner* — Ghazal Shehni
(74) *Attorney, Agent, or Firm* — Schwegman, Lundberg & Woessner

(57) ABSTRACT

A security level for an attendant at a Self-Service Terminal (SST) is automatically resolved. An operation is automatically processed on behalf of the attendant based on the resolved security level and a condition associated with the SST.

16 Claims, 4 Drawing Sheets

AUTOMATED ATTENDED SELF-SERVICE TERMINAL (SST) OPERATIONS

BACKGROUND

Increasingly, enterprises are deploying Self-Service Terminals (SSTs) at various locations for use by consumers. The locations can include financial institutions, grocery stores, retail stores, government venues, entertainment venues, gaming venues, transportation venues, and the like.

One type of SST is an Automated Teller Machine (ATM). ATMs present unique changes to a servicing enterprise because security is of utmost concern. In fact, network access to the network, which the ATM communicates with for financial transactions, is often unavailable for access to servicing engineers. As a result, most service for ATMs occurs in person, where the service personnel are physically present at the ATM.

Service personnel have restricted access to assets of the ATM based on their security level. Many times, lower-level employees are just performing routine operations, such as paper replenishment. The employees are forced to toggle through many hierarchical screens to reach the proper printer functions from the administrative interface. Often, they activate the wrong selections and are informed of such errors by the ATM software. Sometimes, they are unsure of where the printer functions are located within the administrative interface. Possibly, they activate a selection that they were not blocked from using or that they are unauthorized to use and end up performing a function that is unrelated to the printer functions. Because of the complexity with the administrative interface, lower-level employees have to undergo training for even the simplest and non-volatile tasks before given access to the ATM. This can be time consuming and expensive, and particularly so for an enterprise having locations and employees located worldwide.

SUMMARY

In various embodiments, methods and a Self-Service Terminal (SST) for automated attended SST operations are presented.

According to an embodiment, a method for automated attended SST operations is provided. Specifically, a security level for an attendant at the SST is automatically obtained. Next, an operation is automatically processed on behalf of the attendant, the operation resolved based on the security level and a condition of the SST.

DETAILED DESCRIPTION

Figure 1:
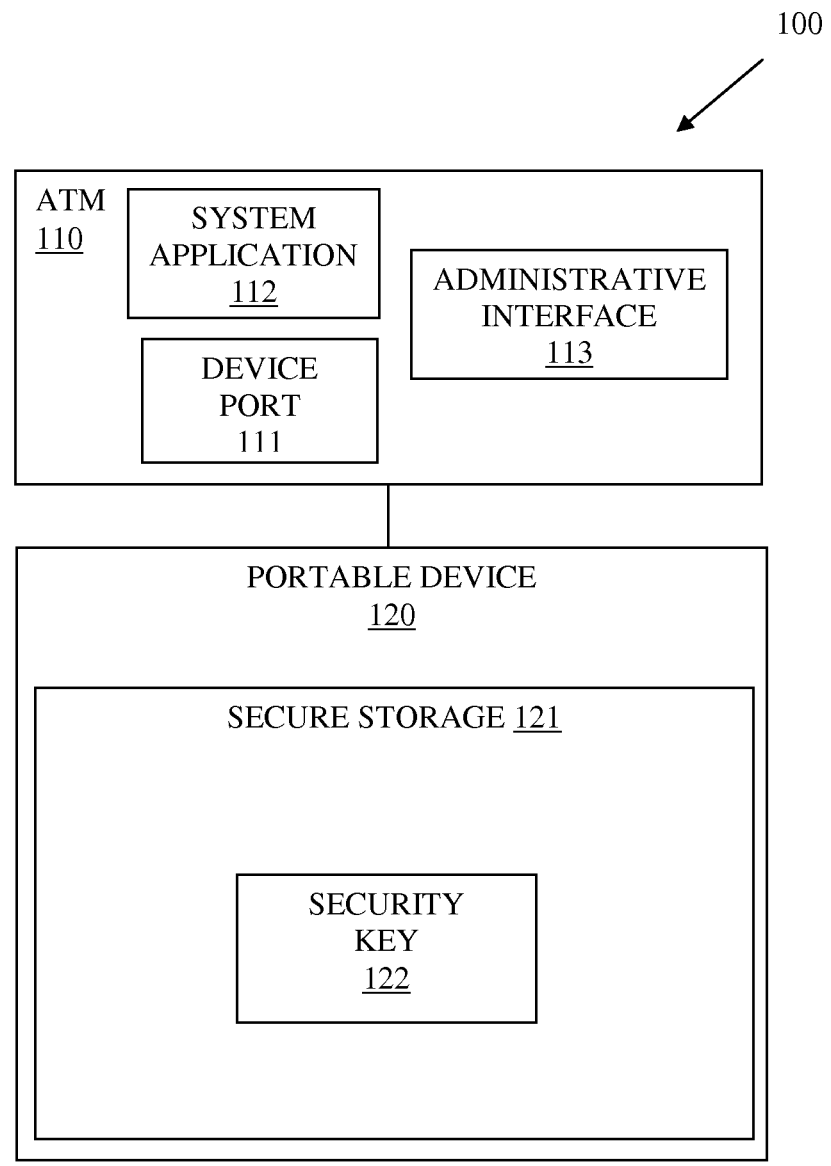
FIG. 1 is a diagram of components for practicing automated attended Self-Service Terminal (SST) operations, according to an example embodiment.

FIG. 1 is a diagram 100 of components for practicing automated attended Self-Service Terminal (SST) operations, according to an example embodiment. It is to be noted that the Automated Teller Machine (ATM) 110 is shown schematically in greatly simplified form, with only those components relevant to understanding of this embodiment being illustrated. The same situation may be true for the portable device 120.

Furthermore, the various components (that are identified in the FIG. 1) are illustrated and the arrangement of the components is presented for purposes of illustration only. It is to be noted that other arrangements with more or less components are possible without departing from the teachings of the automated attended SST operations, presented herein and below.

Furthermore, methods and SST presented herein and below for automated attended SST operations can be implemented in whole or in part in one, all, or some combination of the components shown with the diagram 100. The methods are programmed as executable instructions in memory and/or non-transitory computer-readable storage media and executed on one or more processors associated with the components.

Specifically, the diagram 100 permits execution of automated attended ATM operations utilizing a portable device 120 to transfer information to and from the ATM for purposes of authenticating the portable device 120 and an attendant in possession of the portable device 120. The details of this approach in view of the components, within the diagram 100, are now presented with reference to an embodiment of the FIG. 1 within the context of ATM maintenance and support systems, where the SST is ATM 110 and the portable device 110 is a secure Universal Serial Bus (USB) device 120 (for FIG. 1 referred to as key dongle 120).

However, before discussion of the architecture is presented, it is to be noted that the methods and SST presented herein are not limited to ATM solutions; that is, any SST terminal (kiosk, vending machine, check-in and/or check-out terminal, such as those used in retail, hotel, car rental, healthcare, or financial industries, etc.) for any industry can benefit from the automated attended SST operations discussed herein, including SSTs that lack a network connection entirely, such as some vending machines.

The diagram 100 includes an ATM 110 and a key dongle 120. The ATM includes a device port 111, a system application 112, and an administrative interface 113. The key dongle 120 includes secure storage 121 having a security key 122.

The techniques and features of automated attended SST operations is illustrated with reference to the components of the diagram for a bank employee that needs access to the ATM 110 for purposes of replenishing printer supplies, such as paper for the receipts and/or ink.

The bank employee is provided a secure key dongle 120 for access the ATM 110 through device port 111. Once the key dongle 120 is interfaced to the device port 111, the system application 112 sends an encrypted message to the key dongle 120. The key dongle 120 access secure storage 121 to obtain the security key 122 and decrypt the encrypted message. The key dongle 120 then sends a reply message back to the system application 112 over device port 111. The reply message is used to authenticate the key dongle 120 and obtain the key dongle's serial number. The serial number is used to lookup the level of security associated with the bank employee.

In an embodiment, the system application 112 checks on a status or condition of the ATM 110 and its peripheral devices (value-media dispenser, monitor, keyboard, printer for receipts, camera, etc.) to determine whether the status or condition is related to an operation that the level of security for the bank employee is permitted to perform, such as replenishing paper for the printer.

The system application 112 automatically initiates the paper replenishment operations on the ATM 110 on behalf of the bank employee based on the status of condition and the level of security associated with this bank employee (based on the interfaced key dongle 120). The automatic operations may include, unlocking, and perhaps, opening the door to the receipt printer and pausing the printer functions for paper replenishment.

Additionally, the relevant menu selections and guidance associated with paper replenishment from the administrative interface are automatically initiated in the administrative interface 113 and presented on a screen of the ATM display/monitor.

So, the bank employee needed no prior training and can be walked-through the relevant procedures on the ATM 110 by automatic processing performed by the system application 112. The system application 112 can access and control the administrative interface 113 through an Application Programming Interface (API). The actions of the bank employee can also be monitored by the system application 112 to ensure the bank employee performed the proper actions based on what is presented in the administrative interface 113 to the employee by the system application 112.

It is noted that all selections that are not available to the bank employee based on the security level of the key dongle 120, can be removed from the administrative interface 113 by the system application 112, such that the bank employee is unable to inadvertently perform a wrong operation. This greatly simplifies the process for the bank employee and automatically identifies and initiates operations that the system application 112 determines the bank employee should perform based on the interfaced key dongle 120.

Also, the system application 112 can be used to present, via the administrative interface 113 or via other screens of the ATM display, instructions to the bank employee when physical actions of the bank employee are needed, such as press the paper release lever, remove the paper, insert the new paper, and press the feed advance button.

The system application 112 may also note when actions were taken or not taken, such as lever pushed or not (assuming a sensor or communication mechanism for the lever or any mechanical device of the ATM 110 can provide such status to the system application 112). Selections made within the administrative interface 113 by the bank employee are noted and recorded to a log by the system application 112.

It is noted, that many key dongles can be authorized to access the ATM 110. Each key dongle 120 (based on its serial number) is assigned a security level (role/set of privileges) and each different security level can be tied to different operations available from the administrative interface 113. The system application 112, therefore, customizes what is presented by the administrative interface 113 to just those selections associated with just those operations for a given security level (based on the presented key dongle 120).

It is also noted that some users of the key dongles can have a variety of available operations, such as a customer engineer that may be performing diagnostic tests, gathering logs, installing updates, etc. For these users, their available operations are custom presented for selection in the administrative interface 113 by the security application 112. However, even for custom engineers, the system application may be configured to perform operations, which it knows, that need to be performed based on a current condition or state of the ATM 110, such as run a diagnostic on the dispenser because a "dispense door failed to open for dispensing" status was reported.

So, the system application 112 is capable of a broad range of automated actions to alleviate proprietary knowledge about the administrative interface 113 for the person who is present at the ATM 110 (attending to the ATM 110). This avoids navigation through a variety of hierarchical screens associated with the administrative interface 113 and presents the person present at the ATM 110 with just selections relevant to that person and automatically performs one or more operations on behalf of that person when a detected condition or status indicates it is proper to do so.

In an embodiment, the portable device 120 is a Secure Digital (SD) card.

In an embodiment, the portable device 120 is a Subscriber Identity Module (SIM) card.

In an embodiment, the portable device 120 is a magnetic card.

In an embodiment, the device port 111 is a Near Field Communication (NFC) port.

In an embodiment, the device port 111 is a Bluetooth port.

Figure 2:
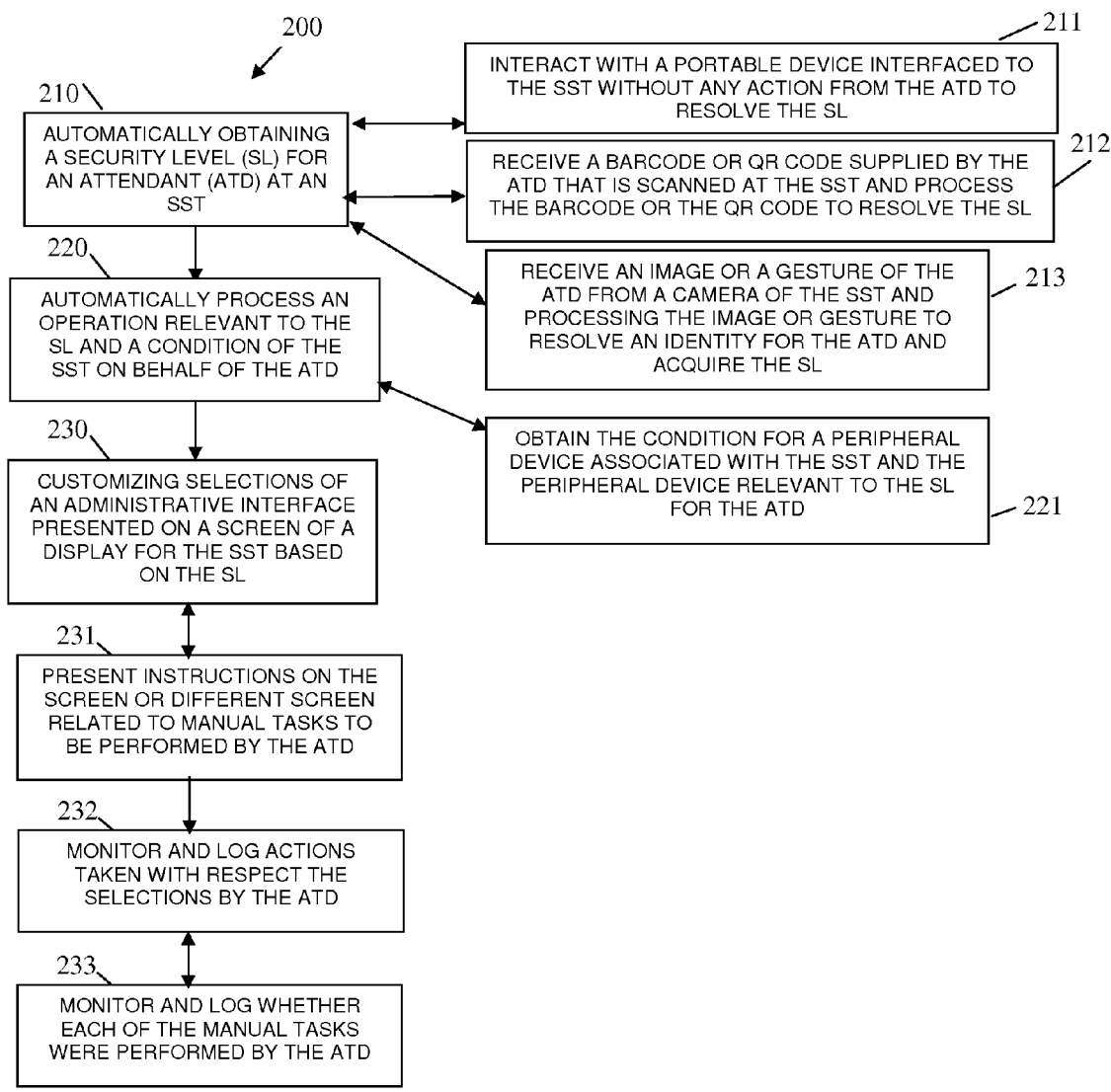
FIG. 2 is a diagram of a method for automated attended SST operations, according to an example embodiment.
Figure 3:
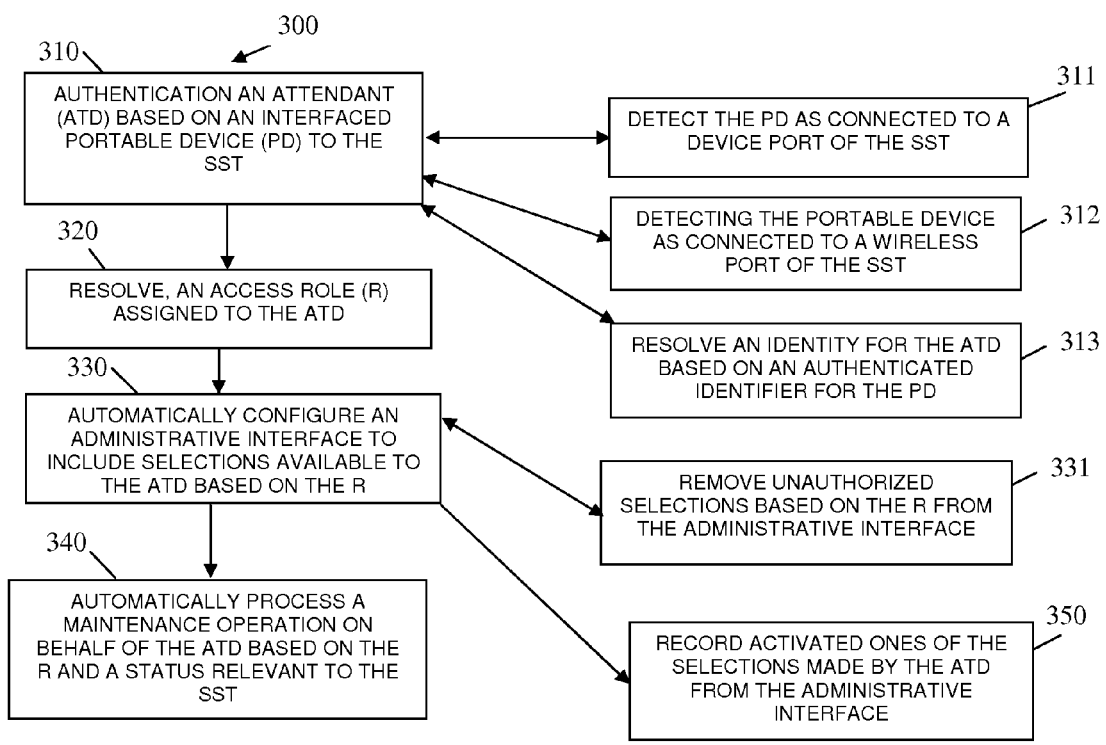
FIG. 3 is a diagram of another for method automated attended SST operations, according to an example embodiment.
Figure 4:
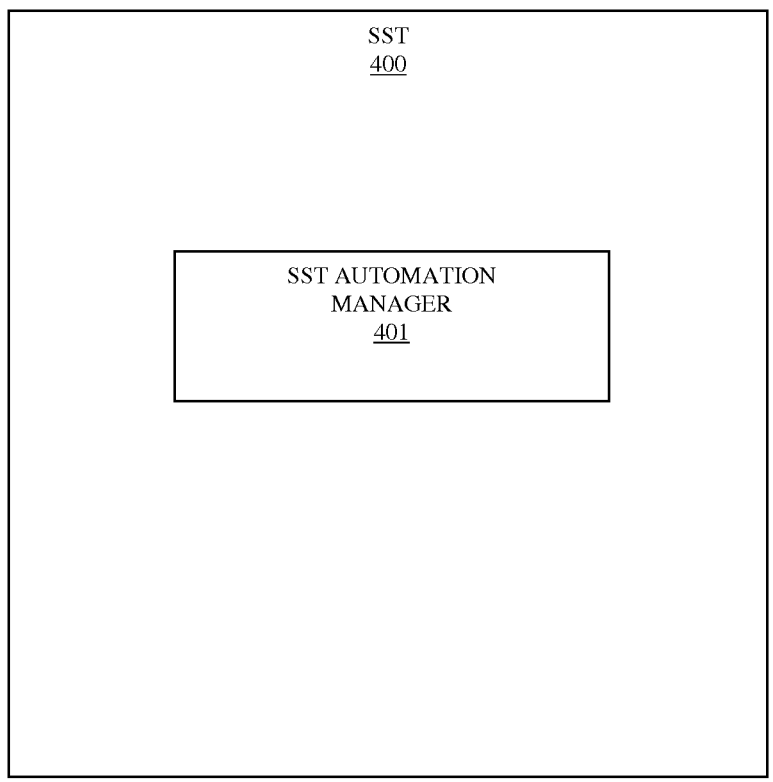
FIG. 4 is a diagram of a SST, according to an example embodiment.

Some embodiments of the diagram 100 and other embodiments of the automated attended SST operations are now discussed with the descriptions of the FIGS. 2-4.

FIG. 2 is a diagram of a method 200 for automated attended SST operations, according to an example embodiment. The software module(s) that implements the method 200 is referred to as a "SST automation manager." The SST automation manager is implemented as executable instructions programmed and residing within memory and/or a non-transitory computer-readable (processor-readable) storage medium and executed by one or more processors of an SST. The processors of the SST that executes the SST automation manager are specifically configured and programmed to process the SST automation manager. The SST automation manager has access to one or more networks during its processing. The networks can be wired, wireless, or a combination of wired and wireless.

In an embodiment, the device that executes the SST automation manager is the ATM 110 of the FIG. 1.

In an embodiment, the device that executes the SST automation manager is a Self-Service (SS) checkout station at a retail store.

In an embodiment, the device that executes the SST automation manager is a kiosk.

In an embodiment, the SST automation manager is the system application 112 of the FIG. 1.

At 210, the SST automation manager automatically obtains a security level for an attendant at the SST. The security level can be automatically obtained in a variety of manner.

For example, at 211, the SST automation manager interacts with a portable device interfaced to the SST without any action from the attendant to resolve the security level.

In an embodiment, at 212, The SST automation manager receives a barcode or a Quick Response (QR) code supplied by the attendant. The barcode or QR code scanned at the SST (such as through a scanner or camera peripheral of the SST) and the SST automation manager processes the barcode or QR code to resolve the security level. The barcode or QR code can be scanned from a display of a mobile device or scanned from a paper.

In an embodiment, at 213, the SST automation manager receives an image or an attendant made gesture supplied from a camera or the SST to resolve an identity for the attendant and acquire the security level. So, facial and/or body gestures can be used to identify the attendant and obtain the security level associated with the attendant.

At 220, the SST automation manager automatically processes an operation relevant to the security level and a condition of the SST on behalf of the attendant. The condition can be a status for the SST, a status for a peripheral device interfaced to the SST, or information housed in a log that is accessible to the SST automation manager.

In an embodiment, at 221, the SST automation manager obtains the condition for a peripheral device associated with the SST, the peripheral device relevant to the security level for the attendant. So, the peripheral device may be an interfaced device that the attendant is authorized to service at the SST.

According to an embodiment, at 230, the SST automation manager customizes selections of an administrative interface presented on a screen of a display for the SST based on the security level. This was discussed above with reference to the FIG. 1.

In an embodiment of 230 and at 231, the SST automation manager presents instructions on the screen or a different screen related to manual tasks to be performed by the attendant. So, tasks of the attendant and how to perform those tasks can be presented in the screen or different screen for the attendant to receive guided assistance while at the SST.

In an embodiment of 231 and at 232, the SST automation manager monitors and logs actions taken by the attendant with respect to the selection of the administrated interface.

In an embodiment of 232 and at 233, the SST automation manager monitors and logs whether each of the manual tasks presented to the attendant were performed by the attendant. This permits the attendant's performance to be evaluated and monitored by supervisors or permits trends with respect to certain tasks to be mined from a log based on what was captured for the attendant and for other attendants authorized to perform the tasks.

FIG. 3 is a diagram of another method 300 for automated attended SST operations, according to an example embodiment. The software module(s) that implements the method 300 is referred to as an "SST maintenance manager." The SST maintenance manager is implemented as executable instructions programmed and residing within memory and/or a non-transitory computer-readable (processor-readable) storage medium and executed by one or more processors of an SST. The processors of the SST that executes the SST maintenance manager are specifically configured and programmed to process the SST maintenance manager. The SST maintenance manager has access to one or more networks during its processing. The networks can be wired, wireless, or a combination of wired and wireless.

In an embodiment, the SST that executes the SST maintenance manager is the ATM 110 of the FIG. 1.

In an embodiment, the SST that executes the SST maintenance manager is a SS checkout station at a retail establishment.

In an embodiment, the SST that executes the SST maintenance manager is a kiosk.

In an embodiment, the SST maintenance manager is the system application 112 of the FIG. 1.

The SST maintenance manager is presented as another processing perspective of and in some was an enhancement of the SST automation manager presented above with reference to the FIG. 2.

At 310, the SST maintenance manager authenticates an attendant based on an interfaced portable device.

In an embodiment, the portable device is the key dongle 120 of the FIG. 1.

In an embodiment, the portable device is one of: a phone, a wearable processing device, a laptop, a Secure Digital (SD) card, a Subscriber Identity Module (SIM) card, and a magnetic card, a tablet.

In an embodiment, at 311, the SST maintenance manager detects the portable device as connected to a device port or the SST. This is a wired connection.

In an embodiment, at 312, the SST maintenance manager detects the portable device as connected to a wireless port.

In an embodiment, at 313, the SST maintenance manager resolves an identity for the attendant based on an authenticated identifier for the portable device (this was discussed above with reference to the FIG. 1).

At 320, the SST maintenance manager resolves an access role assigned to the attendant based on the portable device.

At 330, the SST maintenance manager automatically configures an administrative interface to include just those selections available the attendant based on resolved access role.

In an embodiment, at 331, the SST maintenance manager removes all unauthorized selections from the administrative interface based on the resolved access role.

In an embodiment, at 340, the SST maintenance manager automatically processes a maintenance operation on behalf of the attendant based on the resolved access role and a status relevant to the SST.

FIG. 4 is a diagram of a SST 400, according to an example embodiment. The components of the SST 400 are programmed and reside within memory and/or a non-transitory computer-readable medium and execute on one or more processors of the SST 400. The SST 400 has access and can communicate over one or more networks; and the networks can be wired, wireless, or a combination of wired and wireless.

The SST 400 includes one or more processors, one or more device ports, one or more peripheral devices, one or more displays, and one or more input devices.

In an embodiment, the SST 400 is the ATM 110 of the FIG. 1.

In an embodiment, the SST 400 is an SS checkout station at a retail establishment.

In an embodiment, the SST 400 is a kiosk.

The SST 400 also includes an SST automation manager 401. The SST automation manager 401 is implemented as one or more software modules that execute on processors of the SST 400.

In an embodiment, the SST automation manager 401 is the system application 110 of the FIG. 1.

In an embodiment, the SST automation manager 401 is the SST automation manager of the FIG. 2.

In an embodiment, the SST automation manager 401 is the SST maintenance manager of the FIG. 3.

The SST automation manager 401 is configured and adapted to: authenticate a portable device coupled to an SST port, resolve a security level associated with an attendant at the SST 400, and automatically process an operation on behalf of the attendant and the operation relevant to the security level and a condition of the SST 400.

In an embodiment, when the SST automation manager 401 automatically processes the operation, the SST automation manager 401 resolves the operation based on the condition in view of the security level.

In an embodiment, the SST automation manager 401 is further adapted and configured to customize an administrative interface presented in a screen on a display of the SST.

One now appreciates how maintenance operations of an SST can be automated on behalf of an attendant that is present at the SST to perform some tasks.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method, comprising:
   automatically obtaining, by a Self-Service Terminal (SST) automation manager executing on an SST, a security level for an attendant at the SST, wherein automatically obtaining includes interacting with a portable device interfaced to the SST without any action from the attendant to resolve the security level; and
   automatically processing, by the SST automation manager, processing an operation relevant to the security level and a condition of the SST on behalf of the attendant, wherein automatically processing further includes identifying the operation as a maintenance operation that is automatically initiated on the SST for the attendant based on the condition and the maintenance operation is a particular operation that the attendant should initiate on the SST based on a current status of the SST, and the maintenance operation is automatically initiated on the SST without any action of the attendant and on behalf of the attendant.

2. The method of claim 1 further comprising, customizing, by the Self-Service Terminal (SST) automation manager, selections of an administrative interface presented on a screen of a display for the SST based on the security level.

3. The method of claim 2, wherein customizing further includes presenting instructions on the screen or different screen related to manual tasks to be performed by the attendant.

4. The method of claim 3 further comprising, monitoring and logging, by the Self-Service Terminal (SST) automation manager, actions taken with respect the selections by the attendant.

5. The method of claim 4, wherein monitoring and logging further includes monitoring and logging whether each of the manual tasks were performed by the attendant.

6. The method of claim 1, wherein automatically processing further includes obtaining the condition for a peripheral device associated with the SST and the peripheral device relevant to the security level for the attendant.

7. A method, comprising:
   authenticating, by an Self-Service Terminal (SST) maintenance manager executing on an SST, an attendant based on an interfaced portable device to the SST without any action from the attendant to resolve a security level;
   resolving, by the SST maintenance manager, an access role assigned to the attendant;
   automatically configuring, by the SST maintenance manager, an administrative interface to include selections available to the attendant based on the access role; and
   automatically processing, by the SST maintenance manager, a maintenance operation on behalf of the attendant based on the access role and a status relevant to the SST, wherein the status is a current status for the SST, and wherein automatically processing further includes automatically initiating the maintenance operation on the SST for the attendant based on the status, and the maintenance operation is a particular operation that the attendant should initiate based on the status, and the maintenance operation is initiated on the SST without any action of the attendant and on behalf of the attendant.

8. The method of claim 7 further comprising, recording activated ones of the selections made by the attendant from the administrative interface.

9. The method of claim 7, wherein authentication further includes detecting the portable device as connected to a device port of the SST.

10. The method of claim 7, wherein authenticating further includes detecting the portable device as connected to a wireless port of the SST.

11. The method of claim 7, wherein authentication further includes resolving an identity for the attendant based on an authenticated identifier for the portable device.

12. The method of claim 7, wherein automatically configuring further includes removing unauthorized selections based on the access role from the administrative interface.

13. A Self-Service Terminal (SST), comprising:
   a SST automation manager operable to: (i) execute on the SST, (ii) authenticate a portable device coupled to the SST, (iii) resolve a security level associated with an attendant at the SST without any action from the attendant, and (iv) automatically process an operation on behalf of the attendant relevant to the security level and a condition of the SST, and identify the operation as a maintenance operation that is automatically initiated on the SST for the attendant based on a current status of the SST, and the maintenance operation is a particular operation that the attendant should initiate on the SST based on the current status, and the maintenance operation is initiated on the SST without any action of the attendant and on behalf of the attendant.

14. The SST of claim 13, wherein the SST automation manager is further operable to (v) customize an administrative interface presented in a screen on a display of the SST.

15. The SST of claim 13, wherein (iv) the SST automation manager is further operable to resolve the operation based on the condition of the SST and in view of the security level.

16. The SST of claim 13, wherein SST is an Automated Teller Machine (ATM) and the portable device is a Universal Serial Bus (USB) key dongle.

* * * * *